(12) United States Patent
Tomioka

(10) Patent No.: US 7,768,718 B2
(45) Date of Patent: Aug. 3, 2010

(54) ZOOM LENS

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 42 days.

(21) Appl. No.: 11/892,762

(22) Filed: Aug. 27, 2007

(65) Prior Publication Data
US 2008/0049335 A1 Feb. 28, 2008

(30) Foreign Application Priority Data
Aug. 28, 2006 (JP) .................. P2006-231005

(51) Int. Cl.
*G02B 15/14* (2006.01)
(52) U.S. Cl. ........................ 359/691; 359/676
(58) Field of Classification Search ............... 359/691, 359/676, 682–683, 739; 396/72–88; 348/240.99–204.3; G02B 15/14
See application file for complete search history.

(56) References Cited

U.S. PATENT DOCUMENTS

| | | | |
|---|---|---|---|
| 4,198,128 A | 4/1980 | Ogino | |
| 5,054,897 A * | 10/1991 | Ozawa | 359/691 |
| 5,289,317 A * | 2/1994 | Ikemori et al. | 359/689 |
| 5,652,678 A * | 7/1997 | Suzuki et al. | 359/691 |
| 5,724,193 A | 3/1998 | Hirakawa | |
| 5,737,129 A * | 4/1998 | Ohtake et al. | 359/691 |
| 6,169,635 B1 * | 1/2001 | Ozaki et al. | 359/691 |
| 7,046,454 B2 | 5/2006 | Tomioka et al. | |
| 7,227,700 B2 * | 6/2007 | Oshita | 359/691 |
| 2003/0184876 A1 | 10/2003 | Tomioka | |
| 2006/0077565 A1 | 4/2006 | Tomioka | |
| 2007/0047096 A1 | 3/2007 | Ito et al. | |

FOREIGN PATENT DOCUMENTS

JP 3600870 B2 10/2004
JP 2004-317901 A 11/2004

* cited by examiner

*Primary Examiner*—Darryl J Collins
*Assistant Examiner*—Zachary Wilkes
(74) *Attorney, Agent, or Firm*—Birch, Stewart, Kolasch & Birch, LLP

(57) ABSTRACT

A first group (10) having a negative refractive power, a diaphragm (St) and a second group (20) having a positive refractive power are arranged in order from the object side. Power variation from the wide angle end to the telephoto end is executed by moving the second group (20) to the object side along an optical axis. Correction of an image plane associated with the power variation is made by moving the first group (10) along the optical axis. The second group (20) includes a first lens (L21) having at least one aspheric surface and having a positive refractive power; a cemented lens formed of a second lens (L22) having a positive refractive power and a third lens (L23) having a negative refractive power; a fourth lens (L24) having a negative refractive power; and a fifth lens (L25) having a positive refractive power in order from the object side.

10 Claims, 21 Drawing Sheets

EXAMPLE 1

EXAMPLE 1

EXAMPLE 2

EXAMPLE 3

EXAMPLE 4

EXAMPLE 5

FIG. 6A

| EXAMPLE 1: BASIC LENS DATA | | | | |
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 1 | 27.8167 | 0.80 | 1.88300 | 40.8 |
| 2 | 6.0638 | 3.78 | | |
| 3 | -18.8307 | 0.70 | 1.88300 | 40.8 |
| 4 | 22.6616 | 0.40 | | |
| 5 | 17.0778 | 1.79 | 1.92286 | 18.9 |
| 6 | -81.6854 | D6 (VARIABLE) | | |
| 7 (DIAPHRAGM) | — | D7 (VARIABLE) | | |
| *8 | 9.2776 | 3.34 | 1.56384 | 60.7 |
| *9 | -47.6440 | 0.10 | | |
| 10 | 12.5134 | 3.55 | 1.71300 | 53.9 |
| 11 | -18.1179 | 0.80 | 1.92286 | 18.9 |
| 12 | -39.3480 | 0.10 | | |
| 13 | 20.0845 | 0.93 | 1.92286 | 18.9 |
| 14 | 5.5754 | 1.09 | | |
| 15 | 9.6640 | 2.46 | 1.80518 | 25.4 |
| 16 | -1520.2951 | D16 (VARIABLE) | | |
| 17 | ∞ | 2.00 | 1.51633 | 64.1 |
| 18 | ∞ | | | |

(*: ASPHERIC)

Group 10: surfaces 1–6
Group 20: surfaces 8–16

FIG. 6B

| EXAMPLE 1: DATA CONCERNING ZOOM | | | | | | |
|---|---|---|---|---|---|---|
| | FOCAL LENGTH f | FNO. | ANGLE OF VIEW (2ω) | D6 | D7 | D16 |
| WIDE END | 2.88 | 1.23 | 129.2 | 10.71 | 9.24 | 1.00 |
| TELE END | 9.93 | 2.50 | 34.6 | 1.72 | 0.49 | 9.74 |

FIG. 7

| EXAMPLE 1: ASPHERIC SURFACE DATA | | |
|---|---|---|
| ASPHERIC SURFACE COEFFICIENT | SURFACE NUMBER | |
| | 8TH SURFACE | 9TH SURFACE |
| KA | 2.01257E+00 | -2.34789E+00 |
| RB3 | -1.63665E-04 | 1.05828E-04 |
| RB4 | -3.76027E-04 | -3.98715E-05 |
| RB5 | 3.03312E-05 | 5.86451E-05 |
| RB6 | -5.74966E-06 | 9.31340E-06 |
| RB7 | -8.81038E-07 | -7.74573E-06 |
| RB8 | -5.55543E-08 | 1.36767E-06 |
| RB9 | 5.56588E-08 | -6.27158E-08 |
| RB10 | -7.00208E-09 | -1.44370E-09 |
| RB11 | -1.42172E-10 | -2.86823E-10 |
| RB12 | -1.43909E-11 | -3.44981E-11 |
| RB13 | 2.69698E-12 | -6.31068E-14 |
| RB14 | 6.34297E-13 | 2.43823E-12 |
| RB15 | -1.82194E-13 | -4.65439E-13 |
| RB16 | -1.27748E-15 | 4.65117E-14 |
| RB17 | -4.25356E-16 | -2.29441E-17 |
| RB18 | -6.01204E-17 | -9.23345E-18 |
| RB19 | -6.35379E-18 | -1.46265E-18 |
| RB20 | -7.77706E-19 | -2.42123E-19 |

FIG. 8A

| | EXAMPLE 2: BASIC LENS DATA | | | | |
|---|---|---|---|---|---|
| | Si (SURFACE NUMBER) | Ri (CURVATURE RADIUS) | Di (SURFACE SEPARATION) | Ndj (REFRACTIVE INDEX) | $\nu$dj (ABBE NUMBER) |
| 10 | 1 | 24.2769 | 0.80 | 1.88300 | 40.8 |
| | 2 | 6.0879 | 3.98 | | |
| | 3 | -20.6235 | 0.70 | 1.88300 | 40.8 |
| | 4 | 21.9230 | 0.63 | | |
| | 5 | 16.9544 | 1.68 | 1.92286 | 18.9 |
| | 6 | -467.1009 | D6 (VARIABLE) | | |
| | 7 (DIAPHRAGM) | — | D7 (VARIABLE) | | |
| 20 | *8 | 9.3531 | 3.37 | 1.62041 | 60.3 |
| | *9 | -46.0965 | 0.10 | | |
| | 10 | 12.0757 | 3.63 | 1.69680 | 55.5 |
| | 11 | -17.8806 | 0.65 | 1.92286 | 18.9 |
| | 12 | -45.4869 | 0.10 | | |
| | 13 | 19.8380 | 0.65 | 1.92286 | 18.9 |
| | 14 | 5.4771 | 1.02 | | |
| | 15 | 10.1640 | 2.29 | 1.80809 | 22.8 |
| | 16 | -1173.4533 | D16 (VARIABLE) | | |
| | 17 | ∞ | 2.00 | 1.51633 | 64.1 |
| | 18 | ∞ | | | |

(*: ASPHERIC)

FIG. 8B

| EXAMPLE 2: DATA CONCERNING ZOOM | | | | | | |
|---|---|---|---|---|---|---|
| | FOCAL LENGTH f | FNO. | ANGLE OF VIEW (2$\omega$) | D6 | D7 | D16 |
| WIDE END | 2.80 | 1.23 | 130.9 | 10.71 | 9.48 | 1.00 |
| TELE END | 9.96 | 2.60 | 34.4 | 1.96 | 0.50 | 9.99 |

FIG. 9

| EXAMPLE 2: ASPHERIC SURFACE DATA | | |
|---|---|---|
| ASPHERIC SURFACE COEFFICIENT | SURFACE NUMBER | |
| | 8TH SURFACE | 9TH SURFACE |
| KA | 2.03781E+00 | -2.34787E+00 |
| RB3 | -1.37463E-04 | 1.15708E-04 |
| RB4 | -3.66502E-04 | -5.12839E-05 |
| RB5 | 3.04611E-05 | 5.96549E-05 |
| RB6 | -5.65495E-06 | 9.37405E-06 |
| RB7 | -8.60971E-07 | -7.74542E-06 |
| RB8 | -5.25316E-08 | 1.36726E-06 |
| RB9 | 5.59572E-08 | -6.28167E-08 |
| RB10 | -6.97214E-09 | -1.45206E-09 |
| RB11 | -1.40058E-10 | -2.87429E-10 |
| RB12 | -1.42322E-11 | -3.45209E-11 |
| RB13 | 2.70459E-12 | -6.19220E-14 |
| RB14 | 6.34476E-13 | 2.43869E-12 |
| RB15 | -1.82224E-13 | -4.65379E-13 |
| RB16 | -1.28454E-15 | 4.65183E-14 |
| RB17 | -4.26204E-16 | -2.28830E-17 |
| RB18 | -6.02268E-17 | -9.12371E-18 |
| RB19 | -6.36364E-18 | -1.45292E-18 |
| RB20 | -7.78758E-19 | -2.41100E-19 |

FIG. 10A

| | EXAMPLE 3: BASIC LENS DATA | | | | |
|---|---|---|---|---|---|
| | Si (SURFACE NUMBER) | Ri (CURVATURE RADIUS) | Di (SURFACE SEPARATION) | Ndj (REFRACTIVE INDEX) | $\nu$dj (ABBE NUMBER) |
| 10 | 1 | 26.2470 | 0.80 | 1.88300 | 40.8 |
| | 2 | 6.0032 | 3.91 | | |
| | 3 | −21.5095 | 0.70 | 1.88300 | 40.8 |
| | 4 | 21.8709 | 0.40 | | |
| | 5 | 16.0119 | 1.74 | 1.92286 | 18.9 |
| | 6 | −334.6787 | D6 (VARIABLE) | | |
| | 7 (DIAPHRAGM) | — | D7 (VARIABLE) | | |
| 20 | *8 | 9.3023 | 3.31 | 1.49700 | 81.6 |
| | *9 | −44.2172 | 0.10 | | |
| | 10 | 11.3928 | 3.70 | 1.72916 | 54.7 |
| | 11 | −18.5609 | 0.70 | 1.92286 | 18.9 |
| | 12 | −39.1448 | 0.10 | | |
| | 13 | 17.8858 | 0.70 | 1.84666 | 23.8 |
| | 14 | 5.4243 | 1.04 | | |
| | 15 | 9.9039 | 2.09 | 1.80610 | 33.3 |
| | 16 | 84.5249 | D16 (VARIABLE) | | |
| | 17 | ∞ | 2.00 | 1.51633 | 64.1 |
| | 18 | ∞ | | | |

(*: ASPHERIC)

FIG. 10B

| EXAMPLE 3: DATA CONCERNING ZOOM | | | | | | |
|---|---|---|---|---|---|---|
| | FOCAL LENGTH f | FNO. | ANGLE OF VIEW (2$\omega$) | D6 | D7 | D16 |
| WIDE END | 2.85 | 1.23 | 129.6 | 10.52 | 9.50 | 1.00 |
| TELE END | 9.99 | 2.56 | 34.4 | 1.95 | 0.50 | 10.00 |

FIG. 11

| EXAMPLE 3: ASPHERIC SURFACE DATA | | |
|---|---|---|
| ASPHERIC SURFACE COEFFICIENT | SURFACE NUMBER | |
| | 8TH SURFACE | 9TH SURFACE |
| KA | 2.03488E+00 | -2.34788E+00 |
| RB3 | -2.04125E-04 | 1.41194E-04 |
| RB4 | -3.84816E-04 | -4.27194E-05 |
| RB5 | 3.00490E-05 | 6.05760E-05 |
| RB6 | -5.95320E-06 | 9.53591E-06 |
| RB7 | -8.91827E-07 | -7.73919E-06 |
| RB8 | -5.62857E-08 | 1.36652E-06 |
| RB9 | 5.54033E-08 | -6.29412E-08 |
| RB10 | -7.07218E-09 | -1.47700E-09 |
| RB11 | -1.46710E-10 | -2.90214E-10 |
| RB12 | -1.50326E-11 | -3.49042E-11 |
| RB13 | 2.63260E-12 | -1.03215E-13 |
| RB14 | 6.27080E-13 | 2.43314E-12 |
| RB15 | -1.82789E-13 | -4.65985E-13 |
| RB16 | -1.33209E-15 | 4.64381E-14 |
| RB17 | -4.28866E-16 | -3.09962E-17 |
| RB18 | -6.03273E-17 | -1.03081E-17 |
| RB19 | -6.35475E-18 | -1.57687E-18 |
| RB20 | -7.75822E-19 | -2.56827E-19 |

FIG. 12A

| EXAMPLE 4: BASIC LENS DATA ||||||
|---|---|---|---|---|---|
| | Si (SURFACE NUMBER) | Ri (CURVATURE RADIUS) | Di (SURFACE SEPARATION) | Ndj (REFRACTIVE INDEX) | νdj (ABBE NUMBER) |
| 10 | 1 | 27.8818 | 0.80 | 1.88300 | 40.8 |
| | 2 | 6.0873 | 4.05 | | |
| | *3 | −19.0712 | 0.70 | 1.80400 | 46.6 |
| | *4 | 25.1464 | 0.42 | | |
| | 5 | 17.8632 | 1.72 | 1.92286 | 18.9 |
| | 6 | −173.7366 | D6 (VARIABLE) | | |
| | 7 (DIAPHRAGM) | — | D7 (VARIABLE) | | |
| 20 | *8 | 9.2515 | 3.70 | 1.62299 | 58.2 |
| | *9 | −48.2761 | 0.10 | | |
| | 10 | 12.0815 | 3.55 | 1.72916 | 54.7 |
| | 11 | −19.3801 | 0.65 | 1.92286 | 18.9 |
| | 12 | 99.7440 | 0.10 | | |
| | 13 | 18.9294 | 0.65 | 1.80518 | 25.4 |
| | 14 | 5.5394 | 0.90 | | |
| | 15 | 10.3163 | 2.37 | 1.88300 | 40.8 |
| | 16 | −751.0232 | D16 (VARIABLE) | | |
| | 17 | ∞ | 2.00 | 1.51633 | 64.1 |
| | 18 | ∞ | | | |

(*: ASPHERIC)

FIG. 12B

| EXAMPLE 4: DATA CONCERNING ZOOM ||||||
|---|---|---|---|---|---|
| | FOCAL LENGTH f | FNO. | ANGLE OF VIEW (2ω) | D6 | D7 | D16 |
| WIDE END | 2.89 | 1.23 | 128.8 | 11.09 | 8.99 | 1.00 |
| TELE END | 9.95 | 2.50 | 34.5 | 1.68 | 0.50 | 9.49 |

FIG. 13

| EXAMPLE 4: ASPHERIC SURFACE DATA ||||
|---|---|---|---|---|
| ASPHERIC SURFACE COEFFICIENT | SURFACE NUMBER ||||
| | 3RD SURFACE | 4TH SURFACE | 8TH SURFACE | 9TH SURFACE |
| KA | 9.99872E-01 | 9.99967E-01 | 2.02503E+00 | -2.34783E+00 |
| RB3 | -4.95643E-06 | -2.65071E-05 | -1.00435E-04 | 1.18958E-04 |
| RB4 | 2.70844E-06 | -1.71345E-06 | -3.39725E-04 | -6.11889E-05 |
| RB5 | 3.21951E-07 | -9.75109E-08 | 3.33850E-05 | 5.73525E-05 |
| RB6 | 2.05049E-08 | -3.86409E-09 | -5.54720E-06 | 9.32291E-06 |
| RB7 | 3.01705E-11 | -1.28567E-10 | -8.75225E-07 | -7.73224E-06 |
| RB8 | -1.53062E-10 | -4.70383E-11 | -5.60599E-08 | 1.37019E-06 |
| RB9 | -2.21406E-11 | -1.11016E-11 | 5.55474E-08 | -6.24317E-08 |
| RB10 | -2.87564E-12 | -2.22905E-12 | -7.01951E-09 | -1.40862E-09 |
| RB11 | -2.65577E-13 | -2.98390E-13 | -1.43994E-10 | -2.83547E-10 |
| RB12 | -2.82730E-14 | -4.40640E-14 | -1.46032E-11 | -3.41353E-11 |
| RB13 | -2.34101E-15 | -4.91453E-15 | 2.67824E-12 | -3.15027E-14 |
| RB14 | -2.33156E-16 | -6.46379E-16 | 6.32331E-13 | 2.44157E-12 |
| RB15 | -1.84767E-17 | -6.67592E-17 | -1.82353E-13 | -4.65157E-13 |
| RB16 | -1.78430E-18 | -8.33022E-18 | -1.29266E-15 | 4.65408E-14 |
| RB17 | -1.38146E-19 | -8.29104E-19 | -4.26475E-16 | -2.05272E-17 |
| RB18 | -1.30996E-20 | -1.00755E-19 | -6.02161E-17 | -8.98676E-18 |
| RB19 | -9.97277E-22 | -9.83735E-21 | -6.35985E-18 | -1.44230E-18 |
| RB20 | -9.29158E-23 | -1.17885E-21 | -7.78103E-19 | -2.40050E-19 |

FIG. 14A

| | EXAMPLE 5: BASIC LENS DATA | | | |
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 1 | 28.1940 | 0.80 | 1.88300 | 40.8 |
| 2 | 6.0860 | 4.00 | | |
| 3 | −20.4176 | 0.94 | 1.80400 | 46.6 |
| 4 | 26.6096 | 0.52 | | |
| 5 | 17.7140 | 1.65 | 1.92286 | 18.9 |
| 6 | 8427.4088 | D6 (VARIABLE) | | |
| 7 (DIAPHRAGM) | — | D7 (VARIABLE) | | |
| *8 | 9.3849 | 3.40 | 1.71300 | 53.9 |
| *9 | −55.0135 | 0.10 | | |
| 10 | 12.2254 | 3.54 | 1.49700 | 81.6 |
| 11 | −19.1118 | 0.72 | 1.92286 | 18.9 |
| 12 | −41.0657 | 0.10 | | |
| 13 | 19.1115 | 0.65 | 1.92286 | 20.9 |
| 14 | 5.6662 | 0.84 | | |
| 15 | 10.0452 | 2.34 | 1.88300 | 40.8 |
| 16 | −333.5373 | D16 (VARIABLE) | | |
| 17 | ∞ | 2.00 | 1.51633 | 64.1 |
| 18 | ∞ | | | |

(*: ASPHERIC)

FIG. 14B

| | EXAMPLE 5: DATA CONCERNING ZOOM | | | | | |
|---|---|---|---|---|---|---|
| | FOCAL LENGTH f | FNO. | ANGLE OF VIEW (2ω) | D6 | D7 | D16 |
| WIDE END | 2.88 | 1.23 | 129.3 | 11.09 | 9.12 | 1.00 |
| TELE END | 9.95 | 2.55 | 34.4 | 1.77 | 0.51 | 9.61 |

FIG. 15

| EXAMPLE 5: ASPHERIC SURFACE DATA | | |
|---|---|---|
| ASPHERIC SURFACE COEFFICIENT | SURFACE NUMBER | |
| | 8TH SURFACE | 9TH SURFACE |
| KA | 2.06625E+00 | -2.34783E+00 |
| RB3 | -9.02629E-05 | 1.01874E-04 |
| RB4 | -3.48952E-04 | -6.39754E-05 |
| RB5 | 3.20533E-05 | 5.67023E-05 |
| RB6 | -5.65868E-06 | 9.16760E-06 |
| RB7 | -8.78309E-07 | -7.75175E-06 |
| RB8 | -5.54443E-08 | 1.36723E-06 |
| RB9 | 5.56763E-08 | -6.27432E-08 |
| RB10 | -6.99757E-09 | -1.43551E-09 |
| RB11 | -1.41466E-10 | -2.85857E-10 |
| RB12 | -1.42758E-11 | -3.43600E-11 |
| RB13 | 2.71063E-12 | -4.50598E-14 |
| RB14 | 6.36130E-13 | 2.43946E-12 |
| RB15 | -1.82002E-13 | -4.65328E-13 |
| RB16 | -1.25369E-15 | 4.65245E-14 |
| RB17 | -4.23028E-16 | -2.17874E-17 |
| RB18 | -5.98454E-17 | -9.10417E-18 |
| RB19 | -6.32799E-18 | -1.45093E-18 |
| RB20 | -7.74762E-19 | -2.40804E-19 |

FIG. 16

| | VALUE OF CONDITIONAL EXPRESSION | | | | | |
|---|---|---|---|---|---|---|
| | EXPRESSION (1) | | EXPRESSION (2) | EXPRESSION (3) | EXPRESSION (4) | |
| | m (WIDE END) | m (TELE END) | $\nu_{d2f}$ | $\nu_{d22}$ | $|R_{25f}|$ | $|R_{25r}|$ |
| EXAMPLE 1 | −0.38 | −1.3 | 25.4 | 53.9 | 9.664 | 1520.2951 |
| EXAMPLE 2 | −0.38 | −1.34 | 22.8 | 55.5 | 10.164 | 1173.4533 |
| EXAMPLE 3 | −0.38 | −1.34 | 33.3 | 54.7 | 9.9039 | 84.5249 |
| EXAMPLE 4 | −0.37 | −1.28 | 40.8 | 54.7 | 10.3163 | 751.0232 |
| EXAMPLE 5 | −0.37 | −1.29 | 40.8 | 81.6 | 10.0452 | 333.5373 |

EXAMPLE 1 (WIDE END)

FNO. =1.23

— D-LINE
······ 880nm

-0.1mm   0.1mm
ASPHERICAL
ABERRATION

ω=64.6°

— SAGITTAL
······ TANGENTIAL

-0.1mm   0.1mm
ASTIGMATISM

ω=64.6°

-30%   30%
DISTORTION

EXAMPLE 1 (TELE END)

FNO. =2.50

— D-LINE
······ 880nm

-0.1mm   0.1mm
ASPHERICAL
ABERRATION

ω=17.3°

— SAGITTAL
······ TANGENTIAL

-0.1mm   0.1mm
ASTIGMATISM

ω=17.3°

-30%   30%
DISTORTION

EXAMPLE 2 (WIDE END)

FNO. =1.23

— D-LINE
······ 880nm

-0.1mm   0.1mm
ASPHERICAL ABERRATION

ω=65.4°

— SAGITTAL
······ TANGENTIAL

-0.1mm   0.1mm
ASTIGMATISM

ω=65.4°

-30%   30%
DISTORTION

EXAMPLE 2 (TELE END)

FNO. =2.60

— D-LINE
······ 880nm

-0.1mm   0.1mm
ASPHERICAL ABERRATION

ω=17.2°

— SAGITTAL
······ TANGENTIAL

-0.1mm   0.1mm
ASTIGMATISM

ω=17.2°

-30%   30%
DISTORTION

EXAMPLE 3 (WIDE END)

FNO.=1.23

— D-LINE
······ 880nm

-0.1mm   0.1mm
ASPHERICAL
ABERRATION

ω=64.8°

— SAGITTAL
······ TANGENTIAL

-0.1mm   0.1mm
ASTIGMATISM

ω=64.8°

-30%   30%
DISTORTION

EXAMPLE 3 (TELE END)

FNO.=2.56

— D-LINE
······ 880nm

-0.1mm   0.1mm
ASPHERICAL
ABERRATION

ω=17.2°

— SAGITTAL
······ TANGENTIAL

-0.1mm   0.1mm
ASTIGMATISM

ω=17.2°

-30%   30%
DISTORTION

EXAMPLE 4 (WIDE END)

FNO. =1.23
— D-LINE
······ 880nm
-0.1mm  0.1mm
ASPHERICAL ABERRATION

ω=64.4°
— SAGITTAL
······ TANGENTIAL
-0.1mm  0.1mm
ASTIGMATISM

ω=64.4°
-30%  30%
DISTORTION

EXAMPLE 4 (TELE END)

FNO. =2.50
— D-LINE
······ 880nm
-0.1mm  0.1mm
ASPHERICAL ABERRATION

ω=17.2°
— SAGITTAL
······ TANGENTIAL
-0.1mm  0.1mm
ASTIGMATISM

ω=17.2°
-30%  30%
DISTORTION

EXAMPLE 5 (WIDE END)

FNO. =1.23
— D-LINE
······ 880nm
-0.1mm   0.1mm
ASPHERICAL ABERRATION

ω=64.7°
— SAGITTAL
······ TANGENTIAL
-0.1mm   0.1mm
ASTIGMATISM

ω=64.7°
-30%   30%
DISTORTION

EXAMPLE 5 (TELE END)

FNO. =2.55
— D-LINE
······ 880nm
-0.1mm   0.1mm
ASPHERICAL ABERRATION

ω=17.2°
— SAGITTAL
······ TANGENTIAL
-0.1mm   0.1mm
ASTIGMATISM

ω=17.2°
-30%   30%
DISTORTION

ZOOM LENS

CROSS-REFERENCE TO RELATED APPLICATIONS

This application is based upon and claims the benefit of priority from the Japanese Patent Application No. 2006-231005 filed on Aug. 28, 2006, the entire contents of which are incorporated herein by reference.

BACKGROUND OF THE INVENTION

1. Technical Field

The invention relates to a variable power optical system for use in a video camera and an electronic still camera and particularly, relates to a compact zoom lens suitable for a surveillance dome camera used from a visible range to a near-infrared range, and the like.

2. Description of the Related Art

As a power variable optical system for use in a video camera or an electronic still camera, such a two-group type zoom lens has been known that power variation is executed by moving a second group along an optical axis and correction of an image plane associated with the power variation is made by moving the first group. In particular, for the purpose of a surveillance camera, it is required of such a zoom lens system that good chromatic aberration should be maintained. Japanese Patent No. 3600870 and JP 2004-317901 A (corresponding to U.S. Pat. No. 7,046,454) disclose a lens configuration that chromatic aberration is corrected in a surveillance camera lens system including a negative first group and a positive second group. More specifically, Japanese Patent No. 3600870 discloses such a four-group/five-lens configuration that two positive single lenses are arranged on the object side in the second group and a cemented lens and one positive single lens are arranged subsequently. This cemented lens has a negative refractive power as a whole, and is formed of a negative lens and a positive lens in order from the object side. Also, JP 2004-317901 A discloses such a three-group/four-lens configuration that one positive single lens, a cemented lens formed of a positive lens and a negative lens, and one positive single lens are arranged in order from the object side in the second group.

However, in the optical system for the surveillance camera, nowadays high variable power as well as correction of the chromatic aberration is required. In the above configurations disclosed in Japanese Patent No. 3600870 and JP 2004-317901 A, a variable power ratio is about two. However, variable power (e.g., three or more) higher than this ratio is desired. Meanwhile, with spread of the compact surveillance dome camera, such a demand that an optical system is made so small as to be fitted in the dome is increasing. Also, in the use of the surveillance camera, it is preferable that the chromatic aberration should be corrected satisfactorily from a visible range to a near-infrared range in each variable power range. In the lens disclosed in Japanese Patent No. 3600870, the cemented lens having the negative power as a whole in which the negative lens is arranged in the front portion is used in the second group in order to correct the chromatic aberration. However, with this configuration, the cemented lens is increased in size. For this reason, in order to satisfy higher power variation, this configuration is disadvantageous in size reduction and aberration correction. Therefore, a compact and high variable power zoom lens whose chromatic aberration is satisfactorily corrected particularly from the visible range to the near-infrared range is demanded.

SUMMARY OF THE INVENTION

The invention has been made in view of the above circumstances, and provides a compact and high variable power zoom lens whose chromatic aberration is corrected satisfactorily from the visible range to the near-infrared range particularly for use in surveillance.

According to a first aspect of the invention, a zoom lens includes a first group having a negative refractive power, a diaphragm and a second group having a positive refractive power. The first group, the diaphragm and the second group are arranged in order from an object side. Upon varying a power from a wide angle end to a telephoto end, power variation is executed by moving the second group to the object side along an optical axis. Correction of an image plane associated with the power variation is made by moving the first group along the optical axis. The second group includes a first lens, a cemented lens, a fourth lens and a fifth lens. The first lens has a positive refractive power. The cemented lens is formed of a second lens having a positive refractive power and a third lens having a negative refractive power. The fourth lens has a negative refractive power. The fifth lens has a positive refractive power. The first lens, the cemented lens, the fourth lens and the fifth lens are arranged in order from the object side.

In the zoom lens according to the first aspect of the invention, power variation is executed by moving the second group to the object side along the optical axis and the correction of the image plane associated with this power variation is made by moving the first group. In this zoom lens, the refractive powers and the arrangement of the respective lenses of the second group are set adequately. Especially, the configuration and arrangement of the cemented lens that can contribute largely to the correction of the chromatic aberration are optimized. As a result, this zoom lens is advantageous in correcting various aberration, particularly, the chromatic aberration from the visible range to the near-infrared range in respective power variation ranges while achieving a size reduction, and is suitable for an increase of the variable power.

Also, in the zoom lens according to the first aspect of the invention, the following conditional expression may be satisfied:

$$-1.5 < m < -0.35 \quad (1)$$

where m denotes a lateral magnification of the second group. Since the conditional expression (1) is satisfied, an amount of movement in varying the power can be reduced.

Also, in the zoom lens according to the first aspect of the invention, the following conditional expression may be satisfied:

$$20.0 < vd_{2f} < 45.0 \quad (2)$$

where $vd_{2f}$ denotes an Abbe number of a lens, closest to an image side, of the second group with respect to d-line. In this zoom lens, since the cemented lens is arranged adequately and the chromatic aberration is corrected satisfactorily, a lens material having high dispersion and high refractive index can be selected for the lens, closest to the image side, of the second group, for example. In this case, since the lens material that satisfies the conditional expression (2) is selected particularly, this zoom lens is advantage in increase of the variable power.

Also, in the zoom lens according to the first aspect of the invention, a surface, on the image side, of the third lens constituting the cemented lens in the second group may have a convex shape. Thereby, the refractive power of the respective surfaces of the cemented lens can be optimized and also increase in various aberrations can be suppressed more effectively.

Also, in the zoom lens according to the first aspect of the invention, a surface of the fourth lens on the object side in the second group may have a convex shape. Thereby, the surface shape of the fourth lens can be optimized and also various aberrations can be corrected more effectively.

Also, in the zoom lens according to the first aspect of the invention, the following conditional expressions may be satisfied:

$$v_{d22} > 50.0 \quad (3)$$

$$|R_{25f}| < |R_{25r}| \quad (4)$$

where $v_{d22}$ denotes an Abbe number of the second lens with respect to d-line, $R_{25f}$ denotes a radius of curvature of the fifth lens on the object side, and $R_{25r}$ denotes a radius of curvature of the fifth lens on the image side. Since the conditional expression (3) is satisfied, this zoom lens is advantageous in maintaining the aberration performance from the visible range to the near-infrared range. Also, since the conditional expression (4) is satisfied, the radius of curvature and the surface separation of the fifth lens are optimized with respect to the twenty-fourth lens. Also, this zoom lens is advantageous in correction of various aberrations and in size reduction.

A zoom lens according to a second aspect of the invention includes a first group having a negative refractive power, a diaphragm, and a second group having a positive refractive power. The first group, the diaphragm and the second group are arranged in order from an object side. Upon varying a power from a wide angle end to a telephoto end, power variation is executed by moving the second group to the object side along an optical axis. Correction of an image plane associated with the power variation is made by moving the first group along the optical axis. The second group includes a cemented lens and a lens arranged closest to an image side. The cemented lens is formed of a positive lens and a negative lens. The positive lens and the negative lens are arranged in order from the object side. The cemented lens has a positive refractive power as a whole. The lens arranged closest to the image side has a positive refractive power. The following conditional expression is satisfied:

$$20.0 < v_{d2f} < 45.0 \quad (2)$$

where $v_{d2f}$ denotes an Abbe number of the lens, closest to the image side, of the second group with respect to d-line.

In the zoom lens according to the second aspect of the invention, power variation is executed by moving the second group to the object side along the optical axis and the correction of the image plane associated with this power variation is made by moving the first group. In this zoom lens, the configuration and arrangement of the cemented lens that can contribute largely to the correction of the chromatic aberration are optimized. Also, the configuration of the lens closest to the image side that can contribute largely to increase of the power variation can be set adequately. As a result, this zoom lens is advantageous in correcting various aberrations, particularly the chromatic aberration from the visible range to the near-infrared range in respective power variation ranges while achieving size reduction. Also, this zoom lens is suitable for increase of the variable power. In particular, since the chromatic aberration is corrected satisfactorily by the cemented lens, a lens material having a high dispersion and a high refractive index can be selected for the lens, closest to the image side, of the second group. In this case, since the lens material that satisfies the conditional expression (2), this zoom lens is advantageous in increasing the variable power.

With the zoom lens according to the first aspect of the invention, in the two-group system zoom lens in which the power variation is executed by moving the second group along the optical axis and the correction of the image plane associated with this power variation is made by moving the first group, the refractive powers and the arrangement of the respective lenses of the second group are set adequately, particularly the configuration and arrangement of the cemented lens that can contribute largely to the correction of the chromatic aberration are set adequately. As a result, the compact and high variable power zoom lens system whose chromatic aberration is corrected satisfactorily from the visible range to the near-infrared range and which is suitable for the compact surveillance dome camera for use in surveillance, for example, can be realized.

With the zoom lens according to the second aspect of the invention, in the two-group system zoom lens in which the power variation is executed by moving the second group along the optical axis and then the correction of the image plane associated with this power variation is made by moving the first group, the configuration of the cemented lens that contributes largely to the correction of the chromatic aberration in the second group is designed adequately and the configuration of the lens closest to the image side that contributes largely to increase of the power variation is designed adequately. As a result, the compact and high variable power zoom lens system whose chromatic aberration is corrected satisfactorily from the visible range to the near-infrared range and which is suitable for the compact surveillance dome camera for use in surveillance, for example, can be realized.

BRIEF DESCRIPTION OF THE DRAWINGS

FIG. 6 is Tables showing lens data of the zoom lens according to Example 1, wherein FIG. 6A gives basic lens data and FIG. 6B gives data concerning the zoom.

FIG. 7 is a table showing data about aspheric surfaces of the zoom lens according to Example 1.

FIG. 8 is tables showing lens data of the zoom lens according to Example 2, wherein FIG. 8A gives basic lens data and FIG. 8B gives data concerning the zoom.

FIG. 9 is a table showing data about aspheric surfaces of the zoom lens according to Example 2.

FIG. 10 is tables showing lens data of the zoom lens according to Example 3, wherein FIG. 10A gives basic lens data and FIG. 10B gives data concerning the zoom.

FIG. 11 is a table showing data about aspheric surfaces of the zoom lens according to Example 3.

FIG. 12 is tables showing lens data of the zoom lens according to Example 4, wherein FIG. 12A gives basic lens data and FIG. 12B gives data concerning the zoom.

FIG. 13 is a table showing data about aspheric surfaces of the zoom lens according to Example 4.

FIG. 14 is tables showing lens data of the zoom lens according to Example 5, wherein FIG. 14A gives basic lens data and FIG. 14B gives data concerning the zoom.

FIG. 15 is a table showing data about aspheric surfaces of the zoom lens according to Example 5.

FIG. 16 is a table showing values of conditional expressions in respective Examples collectively.

FIG. 17 is aberration charts showing various aberration of the zoom lens according to Example 1 at the wide angle end, wherein

FIG. 18 is aberration charts showing various aberration of the zoom lens according to Example 1 at the telephoto end, wherein

FIG. 19 is aberration charts showing various aberration of the zoom lens according to Example 2 at the wide angle end, wherein

FIG. 20 is aberration charts showing various aberration of the zoom lens according to Example 2 at the telephoto end, wherein

FIG. 21 is aberration charts showing various aberration of the zoom lens according to Example 3 at the wide angle end, wherein

FIG. 22 is aberration charts showing various aberration of the zoom lens according to Example 3 at the telephoto end, wherein

FIG. 23 is aberration charts showing various aberration of the zoom lens according to Example 4 at the wide angle end, wherein

FIG. 24 is aberration charts showing various aberration of the zoom lens according to Example 4 at the telephoto end, wherein

FIG. 25 is aberration charts showing various aberration of the zoom lens according to Example 5 at the wide angle end, wherein

FIG. 26 is aberration charts showing various aberration of the zoom lens according to Example 5 at the telephoto end, wherein

DETAILED DESCRIPTION OF EMBODIMENTS OF THE INVENTION

Embodiments of the invention will be explained in detail with reference to the drawings hereinafter.

Figure 1:
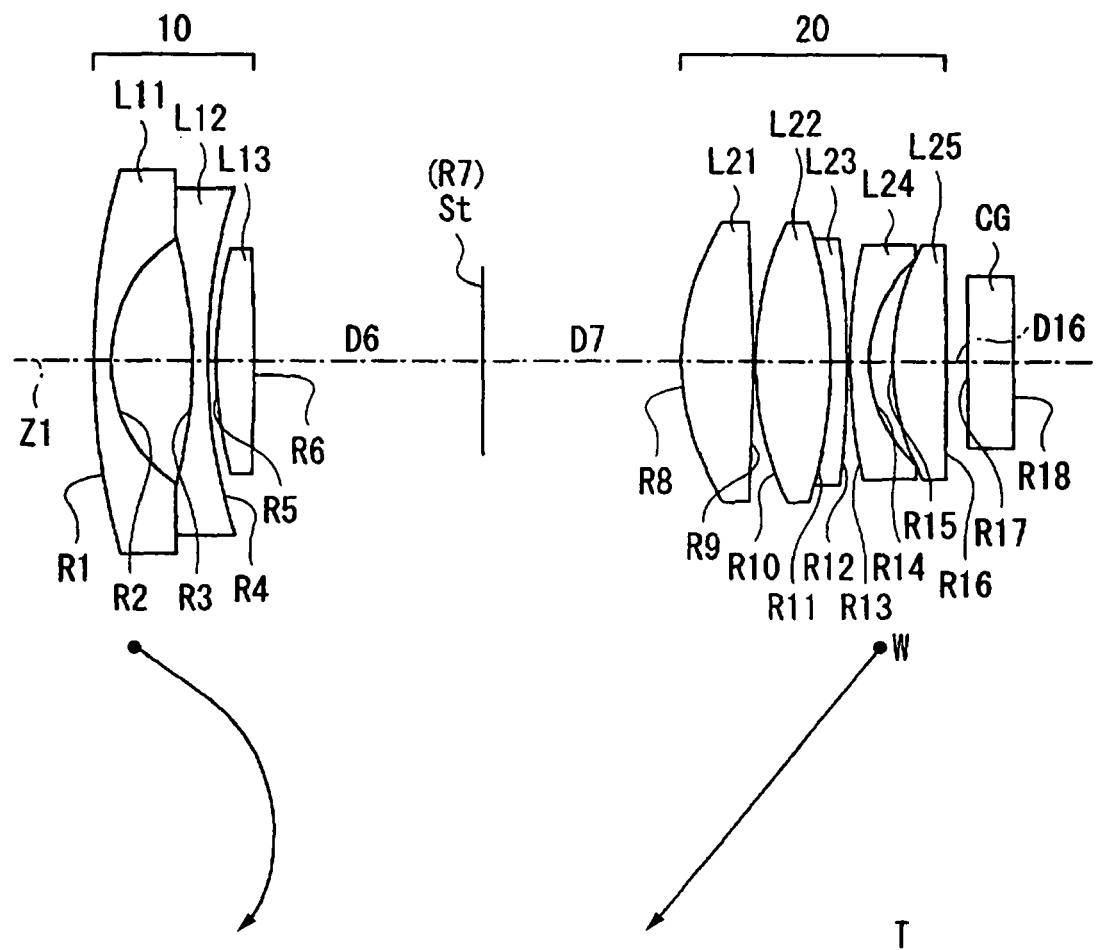
FIG. 1 is a lens section view showing a first configurative example of a zoom lens according to an embodiment of the invention and corresponds to Example 1.
Figure 2:
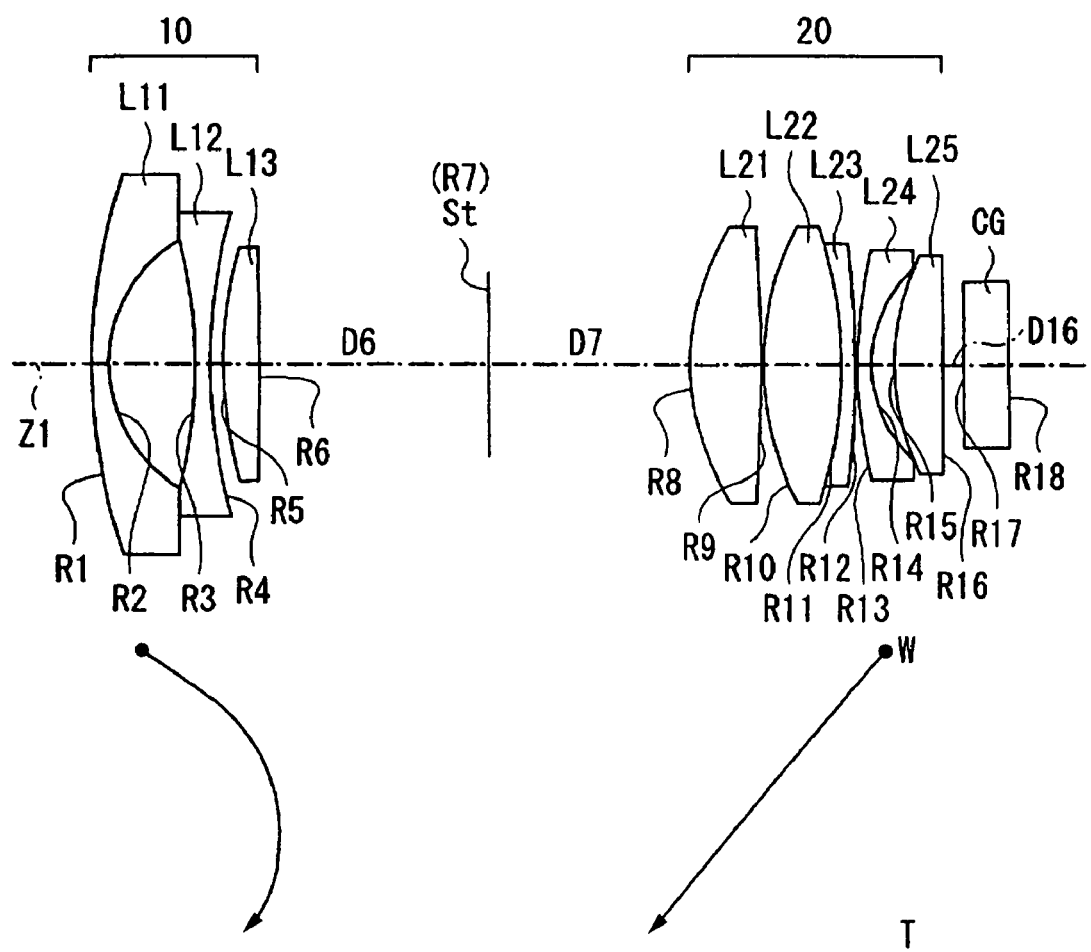
FIG. 2 is a lens section view showing a second configurative example of the zoom lens according to the embodiment of the invention and corresponds to Example 2.
Figure 3:
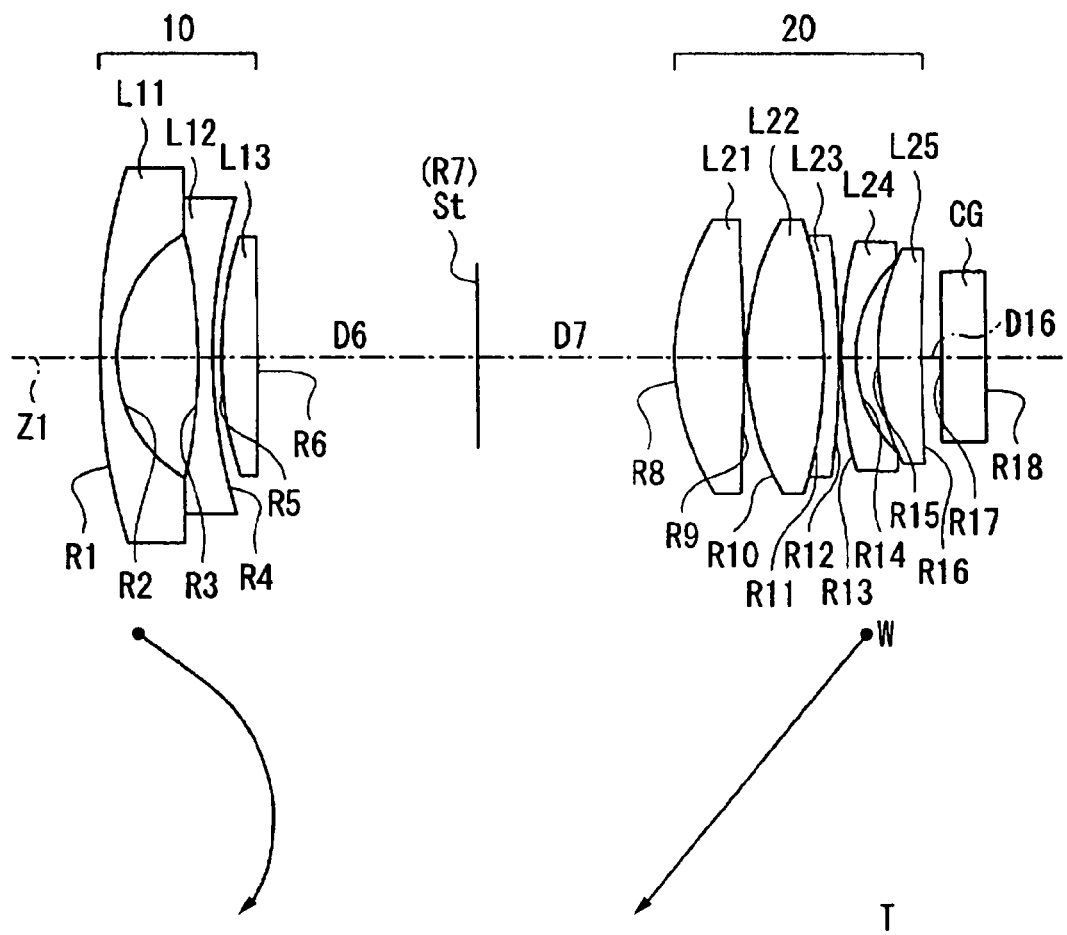
FIG. 3 is a lens section view showing a third configurative example of the zoom lens according to the embodiment of the invention and corresponds to Example 3.
Figure 4:
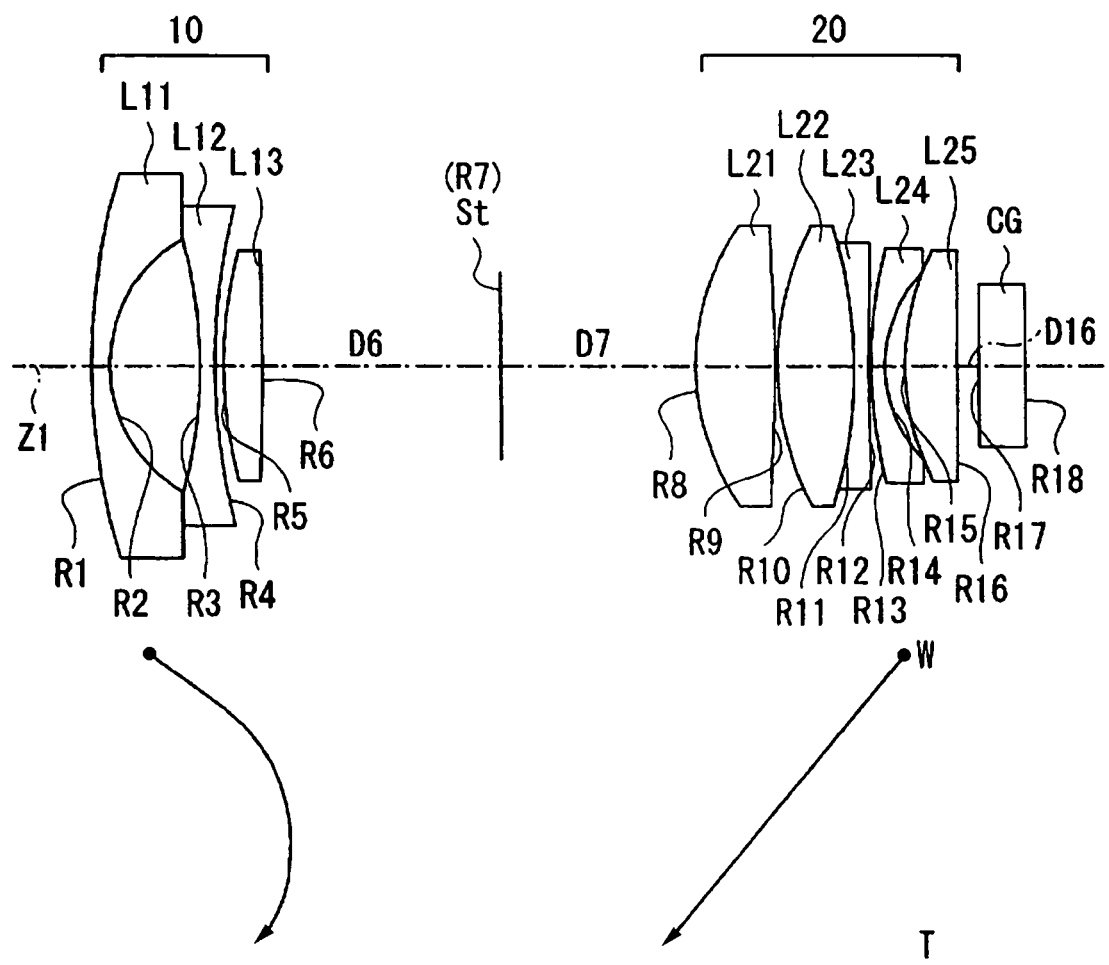
FIG. 4 is a kens section view showing a fourth configurative example of the zoom lens according to the embodiment of the invention and corresponds to Example 4.
Figure 5:
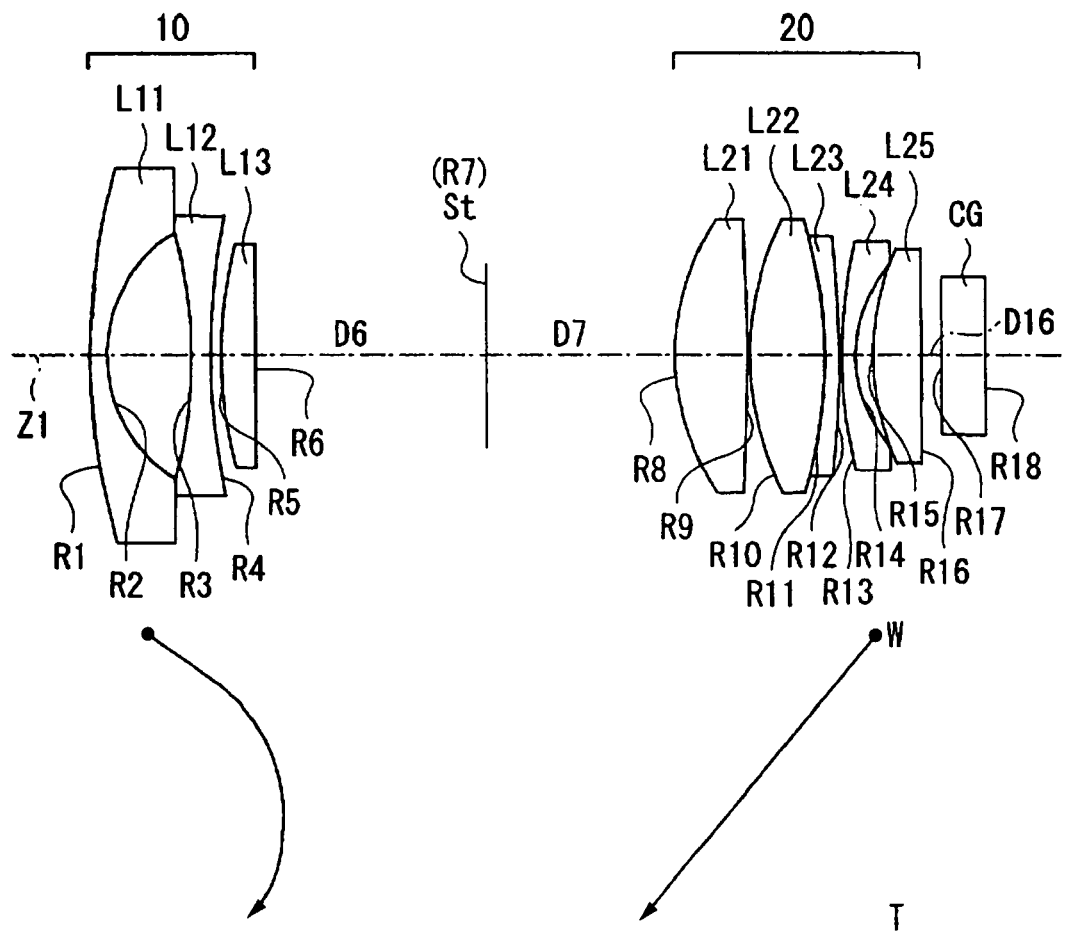
FIG. 5 is a lens section view showing a fifth configurative example of the zoom lens according to the embodiment of the invention and corresponds to Example 5.

FIG. 1 shows a first configurative example of a zoom lens according to an embodiment of the invention and corresponds to Example 1. This configurative example corresponds to a lens configuration in Example 1 (FIG. 6A, FIG. 6B, FIG. 7) described later. FIG. 2 shows a second configurative example and corresponds to a lens configuration in numerical Example 2 (FIG. 8A, FIG. 8B, FIG. 9) described later. FIG. 3 show a third configurative example and corresponds to a lens configuration in numerical Example 3 (FIG. 10A, FIG. 10B, FIG. 11) described later. FIG. 4 shows a fourth configurative example and corresponds to a lens configuration in numerical Example 4 (FIG. 12A, FIG. 12B, FIG. 13) described later. FIG. 5 shows a fifth configurative example and corresponds to a lens configuration in numerical Example 5 (FIG. 14A, FIG. 14B, FIG. 15) described later. Since the basic configurations are similar throughout FIG. 1 to FIG. 5, the configurative example shown in FIG. 1 will be explained basically in the following.

In FIG. 1, a reference symbol Ri denotes a radius of curvature (mm) of an i-th surface when the surface of the constituent element located closest to the object side is referred to as the first surface and the reference is affixed with gradually increasing toward the image side (image plane side). A reference symbol Di denotes a surface separation (mm) between an i-th surface and an i+1-th surface on an optical axis Z1. This reference symbol Di is affixed to only portions that are changed together with the power variation.

This zoom lens is used in a video camera, an electronic still camera, etc., and preferably is used particularly in a compact surveillance dome camera, etc. This zoom lens includes a first group 10 having a negative refractive power, a diaphragm St, and a second group 20 having a positive refractive power, in order from the object side along the optical axis Z1. An imaging device (not shown) such as CCD (Charge Coupled Device) or CMOS (Complementary Metal Oxide Semiconductor) is arranged on the image plane. A planar optical member CG such as a cover glass for protecting the image plane and an infrared cut filter is arranged between the second group 20 and the imaging device in response to the configuration of a camera to which the lens is fitted.

In the above configuration, upon varying power from the wide angle end to the telephoto end, power variation is executed by moving the second group 20 to the object side along the optical axis Z1 and correction of the image plane associated with the power variation is made by moving the first group 10 along the optical axis Z1. At this time, the first group 10 and the second group 20 move to draw a locus indicated by the solid line in FIG. 1. In FIG. 1, "W" indicates a lens position at the wide angle end and "T" indicates a lens position at the telephoto end.

The first group 10 has a first lens L11 having a negative refractive power, a second lens L12 having a negative refractive power, and a third lens L13 having a positive refractive power in order from the object side, for example. The first lens L11 has a meniscus shape with a convex surface directed to the object side, for example. The second lens L12 has a biconcave shape, for example. The third lens L13 has a convex surface on the object side, for example.

The second group 20 has a first lens L21 having a positive refractive power, a cemented lens formed of a second lens L22 which has a positive refractive power and a third lens L23 having a negative refractive power and which has a positive refractive power as a whole, a fourth lens L24 having a negative refractive power, and a fifth lens L25 having a positive refractive power in order from the object side, for example. It is preferable that a surface of the third lens L23 on the image side has a convex shape. More preferably, the third lens L23 has a meniscus shape with the convex surface is directed to the image side. It is preferable that a surface of the fourth lens L24 on the object side has a convex shape. More preferably, the fourth lens L24 has a meniscus shape with the convex surface directed to the object side. Also, it is preferable that the cemented lens formed of the second lens L22 and the third lens L23 has a strong positive refractive power on the surface on the object side. In addition, it is preferable that the second group 20 has at least one aspheric lens. For example, it is preferable that at least one surface of the first lens L21 has an aspheric shape.

Also, it is preferable that the second group 20 satisfies the following conditional expression (1):

$$-1.5 < m < -0.35 \quad (1)$$

where m denotes a lateral magnification of the second group 20.

In addition, it is preferable that the second group 20 satisfies the following conditional expression (2):

$$20.0 < \nu_{d2f} < 45.0 \quad (2)$$

where $\nu_{d2f}$ denotes an Abbe number of the lens, closest to the image side, of the second group 20 with respect to d-line.

Further, it is preferable that the second group 20 satisfies the following conditional expression (3):

$$\nu_{d22} > 50.0 \quad (3)$$

where $\nu_{d22}$ denotes an Abbe number of the second lens L22 with respect to d-line.

Moreover, it is preferable that the second group 20 satisfies the following conditional expression (4).

$$|R_{25f}| < |R_{25r}| \quad (4)$$

where $R_{25f}$ denotes a radius of curvature of the fifth lens L25 on the object side, and $R_{25r}$ denotes a radius of curvature of the fifth lens L25 on the image side.

Next, an operation and advantages of the zoom lens constructed as above will be explained.

In this zoom lens, the power variation is executed by moving the second group 20 along the optical axis Z1 to the object side, and the correction of the image plane associated with this power variation is executed by the first group 10. In particular, since the first lens L21 having the positive refractive power and the cemented lens which is formed of the positive lens L22 and the negative lens L23 and which has the positive refractive power as a whole are arranged on the object side in the second group 20, a luminous flux diverged in the first group is converged by the positive lens L21 and the cemented lens in the second group. Accordingly, an increase in the spherical aberration and generation of the longitudinal chromatic aberration can be suppressed effectively. In particular, the longitudinal chromatic aberration can be suppressed more effectively by providing the cemented lens as compared with the case where a single lens is provided. Also, since the generation and increase of various aberrations can be suppressed effectively in this manner, a material having a high refractive index and a high dispersion can be selected for the lens (fifth lens L25) of the second group 20 located closest to the image side. In this case, when the lens material to satisfy the conditional expression (2) particularly is selected, such a material is more advantageous in increase of the power variation. As a result, the variable power ratio can be increased while maintaining the high aberration performance. Also, since the two lenses following the cemented lens are designed to have the negative refractive power and the positive refractive power, respectively, in the second group 20, correction of the image plane and correction of the lateral chromatic aberration can be done satisfactorily.

Also, if the surface of the third lens L23 on the image side which is the lens of the cemented lens on the image side has a convex shape in the second group 20, the positive refractive power can be distributed to surfaces other than the cemented surface of the cemented lens. Thus, an increase of the spherical aberration can be suppressed more effectively. Also, if the cemented lens is designed to have a strong positive refractive power on its surface on the object side, a height, from the optical axis, of light exiting from the cemented lens can be lowered, which is advantageous in correcting various aberrations. If such a configuration is employed that a negative refractive power is given to the second lens L22 and a negative lens is arranged precedingly as the cemented lens, it is difficult to give a strong positive refractive power to the surface of the cemented lens on the object side. It is difficult to ensure high optical performance. Therefore, such configuration is not preferable.

In addition, if the negative fourth lens L24 is designed to have a convex surface directed to the object side in the second group 20, the spherical aberration can be corrected more effectively. If the fourth lens L24 has a concave surface directed to the object side, a negative refractive power is increased on the surface of the fourth lens L24 on the object side, particularly in the peripheral portion, on which light exiting from the third lens L23 is incident. Therefore, the correction of the spherical aberration becomes insufficient.

The conditional expression (1) is an expression concerning the lateral magnification of the second group 20. If the lateral magnification exceeds the upper limit of the conditional expression (1), a negative refractive power provided to the first group 10 is weakened. Thus, an amount of movement caused by the power variation is increased to hinder size reduction. If the lateral magnification falls below the lower limit of the conditional expression (1), a negative refractive power provided to the first group 10 is strengthened. Thus the correction of the spherical aberration on the telephoto end is made insufficient particularly. Therefore, such situation is not preferable.

The conditional expression (2) is an expression concerning the Abbe number of the lens, closest to the image side, of the second group 20 with respect to d-line. If this Abbe number exceeds the upper limit of the conditional expression (2), the correction of the chromatic aberration on the short-wavelength side becomes insufficient. If this Abbe number falls below the lower limit of the conditional expression (2), the correction of the chromatic aberration in a near-infrared range becomes insufficient. Therefore, such situation is not preferable.

The conditional expression (3) is an expression concerning the Abbe number of the second lens L22 with respect to d-line. If this Abbe number falls below the lower limit of the conditional expression (3), the longitudinal chromatic aberration is increased at the second lens L22. It is difficult to maintain the aberration performance from the visible range to the near-infrared range. Therefore, such situation is not preferable.

The conditional expression (4) is an expression concerning the radius of curvature of the fifth lens L25 on the object side and the radius of curvature of the fifth lens L25 on the image side. If the conditional expression (4) is not satisfied, a difference between the radius of curvature of the fourth lens L24 on the image side and the radius of curvature of the fifth lens L25 on the object side is excessively increased, which is disadvantageous in correcting the lateral chromatic aberration. At the same time, such a configuration requires to expand an interval between the surface of the fourth lens L24 on the image side and the surface of the fifth lens L25 on the object side, which is disadvantageous in size reduction. Therefore, such situation is not preferable.

As explained above, according to the zoom lens of this embodiment, the refractive powers of the respective lenses of the second group 20 and the arrangement of the respective lenses of the second group 20 are set adequately, particularly the configuration and the arrangement of the cemented lens that contributes largely to the correction of the chromatic aberration are set adequately. As a result, the compact and high variable power zoom lens system whose chromatic aberration is corrected satisfactorily from the visible range to the near-infrared range and which is suitable for the compact surveillance dome camera for the purpose of surveillance, for example, can be realized.

EXAMPLES

Next, specific numerical Examples 1 to 5 of the zoom lens according to this embodiment will be explained collectively on the basis of Example 1.

As Example 1, specific lens data corresponding to the configuration of the zoom lens shown in FIG. 1 are given in FIG. 6A, FIG. 6B and FIG. 7. FIG. 6A gives basic lens data, FIG. 6B gives data concerning zooming, and FIG. 7 gives data about aspheric surfaces.

In FIG. 6A, in the column of a surface number Si, number of an i-th (i=1 to 18) surface to which the reference is affixed with gradually increasing toward the image side is given when the surface of the constituent element located closest to the object side is set as a first surface. In the column of a radius of curvature Ri, a value (mm) of a radius of curvature of an i-th surface from the object side is given to correspond to the reference Ri affixed in FIG. 1. In the column of a surface separation Di, similarly the surface separation (mm) between an i-th surface Si from the object side and an i+1-th surface Si+1 on the optical axis Z1 is given. In the columns of Ndj and vdj, refractive index and Abbe number of a j-th (j=1 to 9) optical component from the object side with respect to d-line (wavelength 587.6 nm) are given, respectively. Also, a symbol "*" attached to the left side of the surface number denotes that the lens surface has an aspheric shape. A radius of curvature Ri of the aspheric surface shows a value of the radius of curvature near the optical axis. Here, since the first group 10 and the second group 20 move on the optical axis along with the power variation, the values of the surface separations D6, D7, D16 are variable.

In FIG. 6B, values of the variable surface separations D6, D7, D16 at the wide angle end and the telephoto end are given as data concerning the zoom. Also, in FIG. 6B, a focal length f (mm), F-number (FNO.), and an angle of view 2ω (ω: half angle of view) of the total system are also given at the wide angle end and the telephoto end.

In particular, in the zoom lens of Example 1, both surfaces (eighth surface, ninth surface) of the first lens L21 of the second group 20 have an aspheric shape. Also, a power variation ratio from the wide angle end to the telephoto end is set to about 3.5.

In numerical values given as the aspheric data shown in FIG. 7, a symbol "E" denotes that a numerical value subsequent to "E" is a "power exponent" to the base 10, and means that the numerical value preceding to "E" is multiplied by the numerical value that is expressed by the exponential function using 10 as the base. For example, "1.0E−02" corresponds to "1.0×10$^{-2}$."

As the aspheric data, values of respective coefficients $RB_i$, KA in the aspheric shape equation represented by the following equation (A) are given. Here, Z denotes a length (mm) of perpendicular from a point on the aspheric surface in a position at a height h from the optical axis to a tangent plane to a vertex of the aspheric surface (plane perpendicular to the optical axis). Respective aspheric surfaces are expressed by using the third to twentieth coefficients $RB_3$ to $RB_{20}$ effectively as the aspheric coefficient $RB_i$.

$$Z = C \cdot h^2 / \{1 + (1 - KA \cdot C^2 \cdot h^2)^{1/2}\} + \Sigma RB_i \cdot h^i \quad (A)$$

(i=3 to n, n: integral number of 3 or more)

where Z: a depth of an aspheric surface (mm)

h: a distance (height) from the optical axis to the lens surface (mm)

KA: conical constant

C: paraxial curvature=1/R (R: paraxial radius of curvature)

$RB_i$: i-th aspheric coefficient

Like above Example 1, lens data of the zoom lens according to Example 2 are given in FIG. 8A, FIG. 8B, and FIG. 9. Similarly, lens data of the zoom lens according to Example 3 are given in FIG. 10A, FIG. 10B, and FIG. 11. Similarly, lens data of the zoom lens according to Example 4 are given in FIG. 12A, FIG. 12B, and FIG. 13. In Example 4, both surfaces (third surface, fourth surface) of the second lens L12 of the first group 10 and both surfaces (eighth surface, ninth surface) of the first lens L21 of the second group 20 have an aspheric shape. Similarly, lens data of the zoom lens according to Example 5 are given in FIG. 14A, FIG. 14B, and FIG. 15. The surface of the third lens L23 on the image side has a convex shape in Examples other than Example 4. In Example 4, the surface of the third lens L23 on the image side has a concave shape.

In FIG. 16, values in the conditional expressions (1) to (4) are given collectively in respective Examples. As shown in FIG. 16, the respective values fall within the numerical ranges of the respective conditional expressions in all Examples.

Figure 17A:
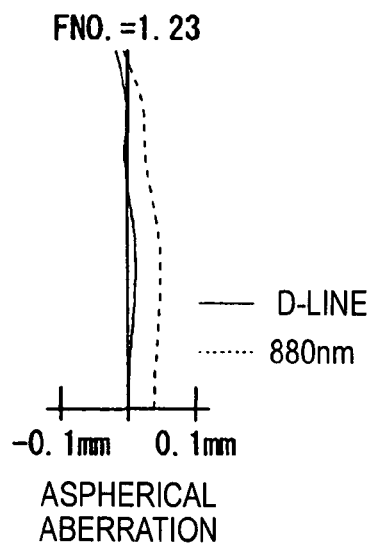
FIG. 17A shows spherical aberration.
Figure 17B:
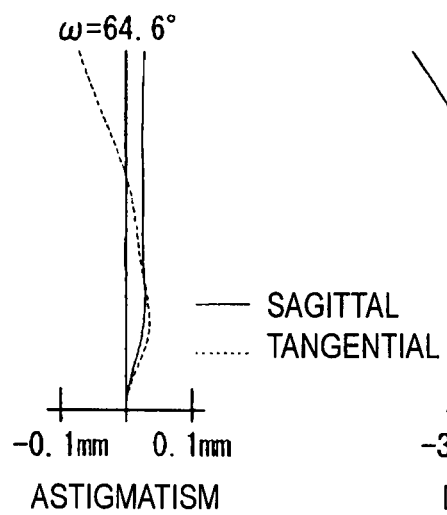
FIG. 17B shows astigmatism.
Figure 17C:
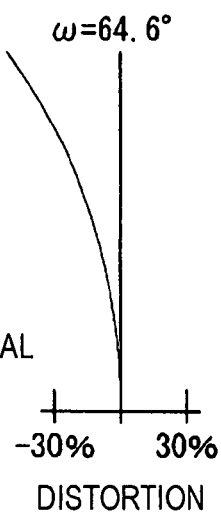
FIG. 17C shows distortion.
Figure 18A:
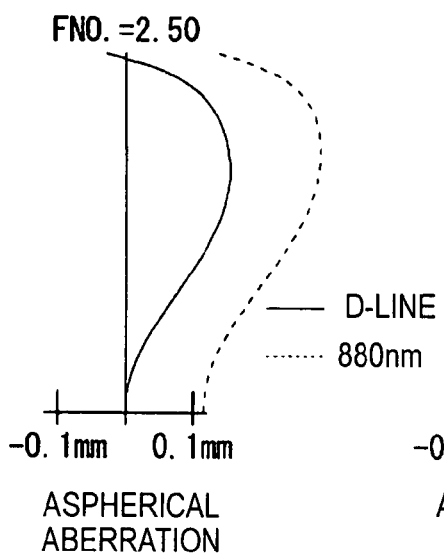
FIG. 18A shows spherical aberration.
Figure 18B:
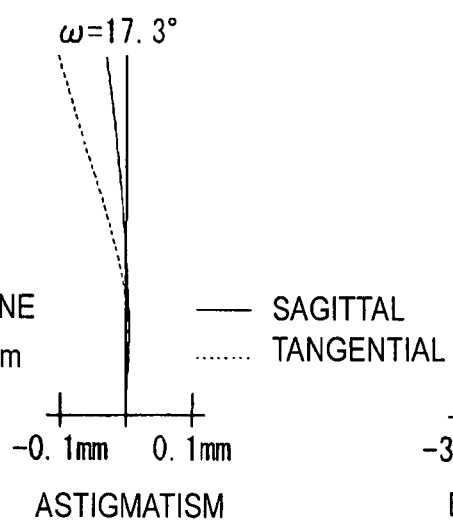
FIG. 18B shows astigmatism.
Figure 18C:
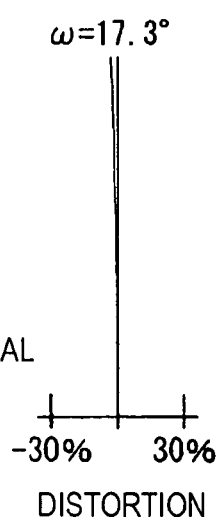
FIG. 18C shows distortion.

In FIG. 17A to FIG. 17C, the spherical aberration, astigmatism, and distortion (distortion aberration) of the zoom lens according to Example 1 at the wide angle end are shown. In FIG. 18A to FIG. 18C, similarly the respective aberrations of the zoom lens according to Example 1 at the telephoto end are shown. In the respective aberration charts, aberrations obtained by using a d-line (wavelength 587.6 nm) as a reference wavelength are shown. Also, aberrations obtained by using a wavelength 880 nm in a near-infrared range are shown in the spherical aberration charts. In the astigmatism charts, the solid line shows aberration in the sagittal direction and the broken line shows aberration in the tangential direction. FNO. shows F-number and ω shows a half angle of view.

Figure 19A:
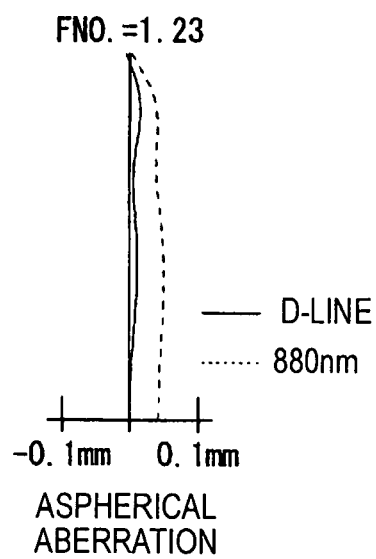
FIG. 19A shows spherical aberration.
Figure 19B:
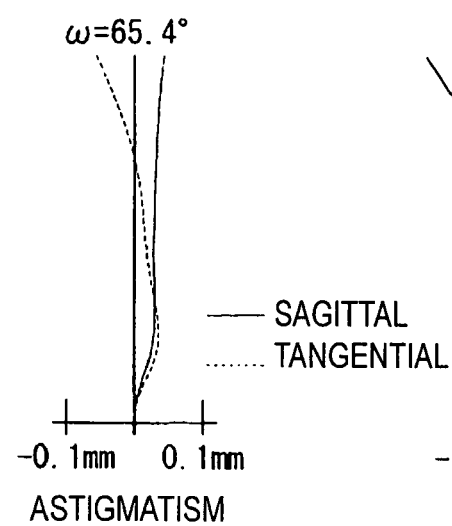
FIG. 19B shows astigmatism.
Figure 19C:
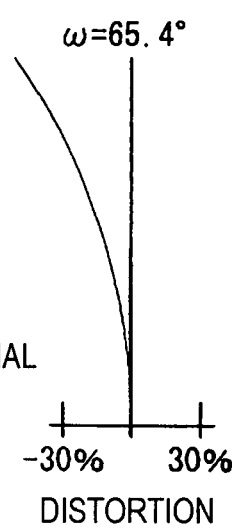
FIG. 19C shows distortion.
Figure 20A:
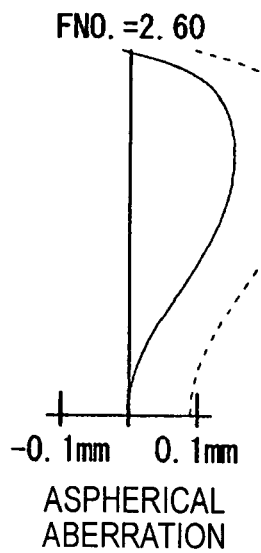
FIG. 20A shows spherical aberration.
Figure 20B:
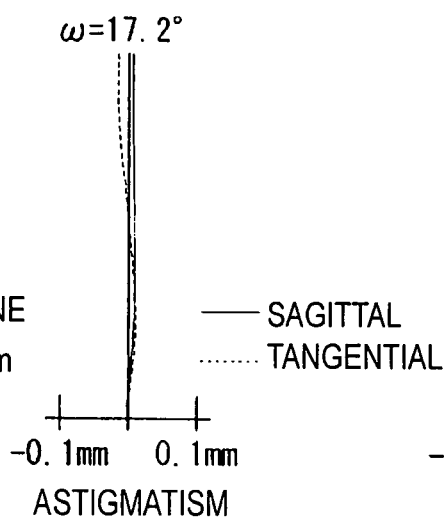
FIG. 20B shows astigmatism.
Figure 20C:
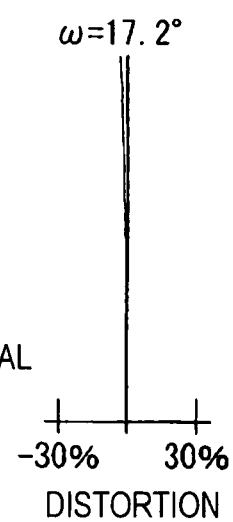
FIG. 20C shows distortion.
Figure 21A:
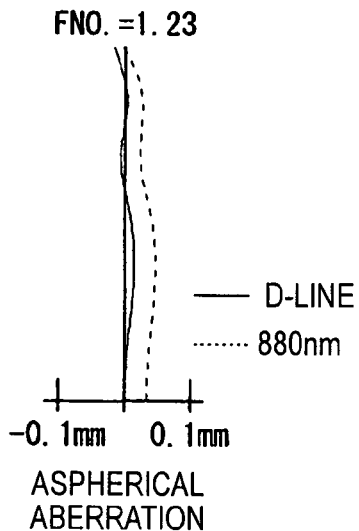
FIG. 21A shows spherical aberration.
Figure 21B:
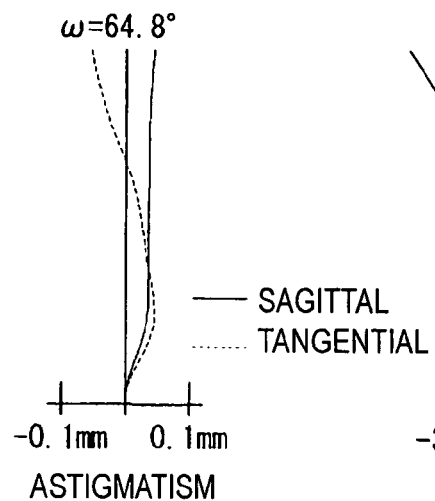
Figure 21C:
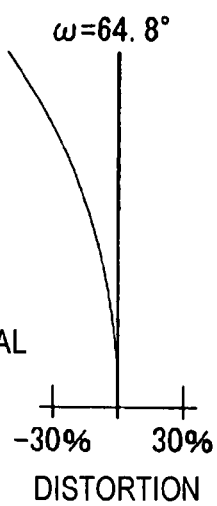
Figure 22A:
FIG. 22A shows spherical aberration.
Figure 22B:
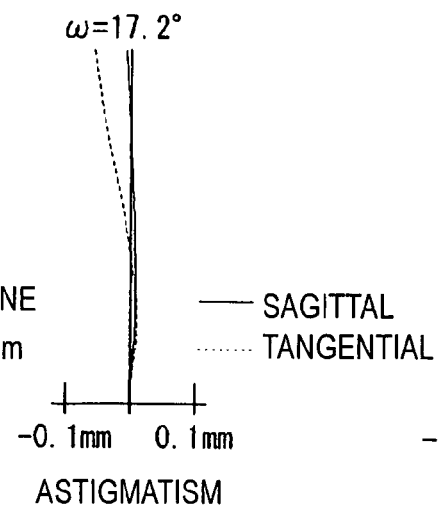
FIG. 22B shows astigmatism.
Figure 22C:
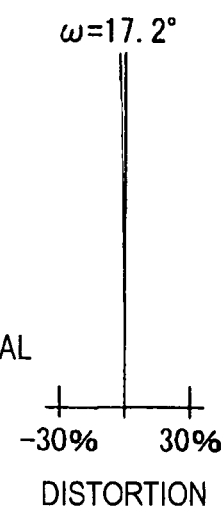
FIG. 22C shows distortion.
Figure 23A:
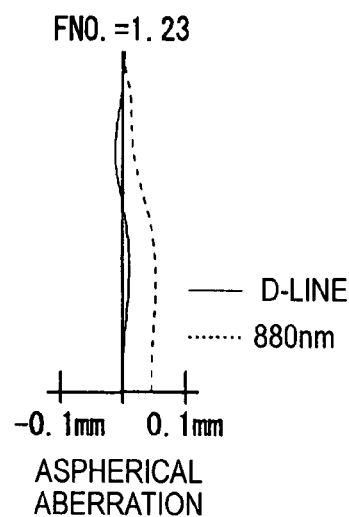
FIG. 23A shows spherical aberration.
Figure 23B:
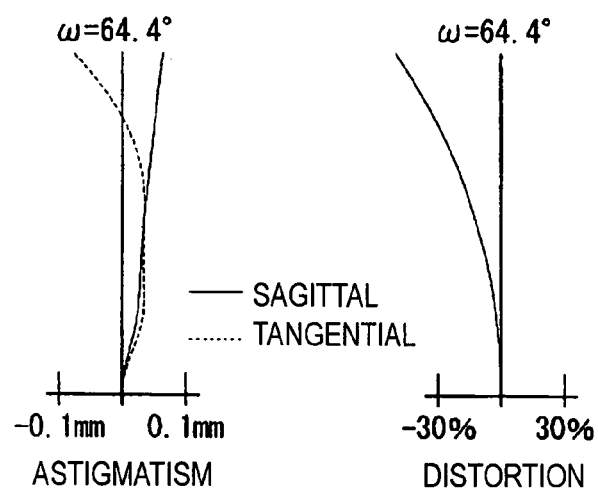
FIG. 23B shows astigmatism.
Figure 23C:
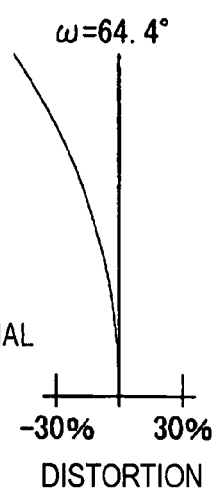
FIG. 23C shows distortion.
Figure 24A:
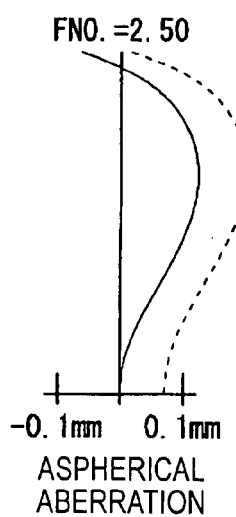
FIG. 24A shows spherical aberration.
Figure 24B:
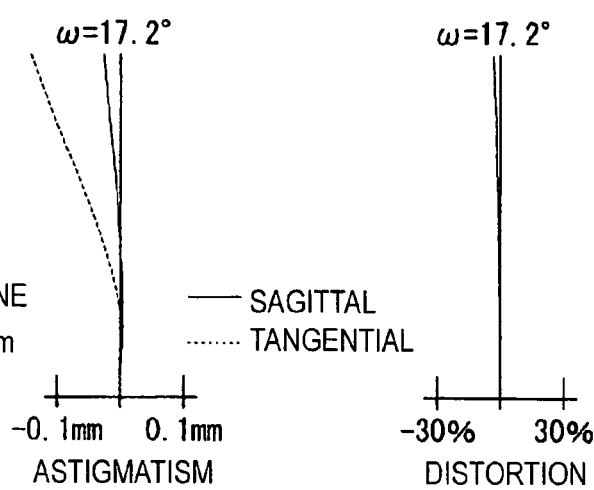
FIG. 24B shows astigmatism.
Figure 24C:
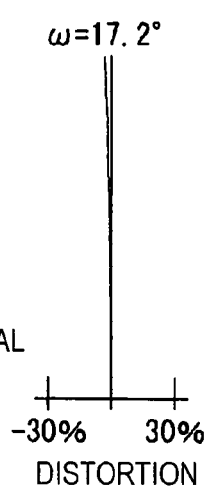
FIG. 24C shows distortion.
Figure 25A:
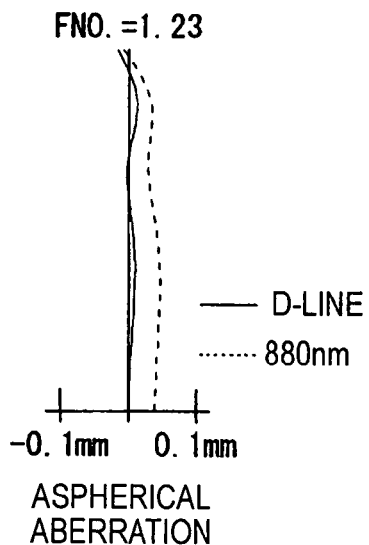
FIG. 25A shows spherical aberration.
Figure 25B:
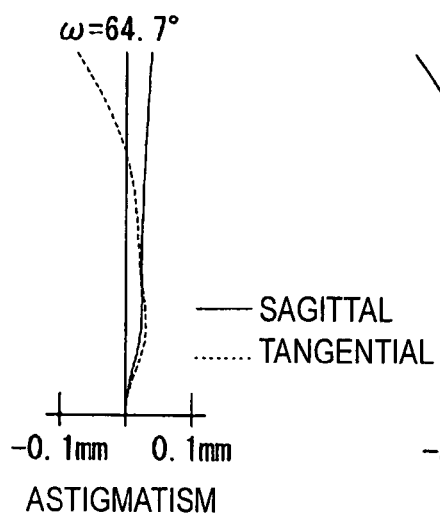
FIG. 25B shows astigmatism.
Figure 25C:
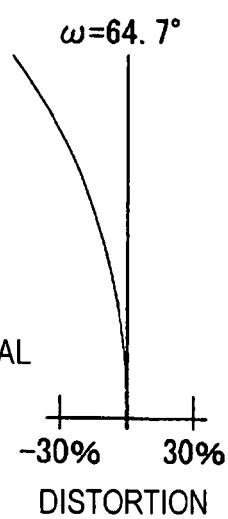
FIG. 25C shows distortion.
Figure 26A:
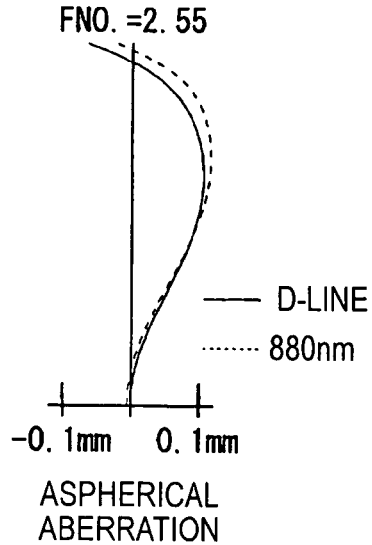
FIG. 26A shows spherical aberration.
Figure 26B:
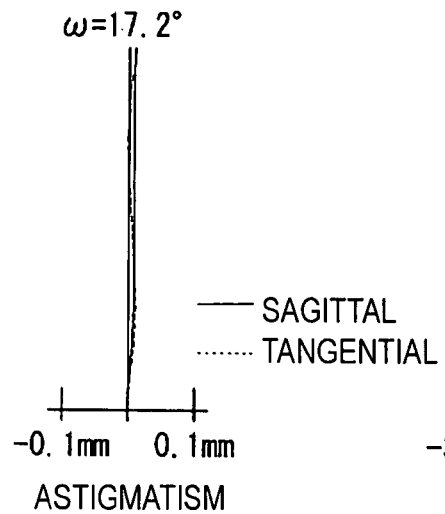
FIG. 26B shows astigmatism.
Figure 26C:
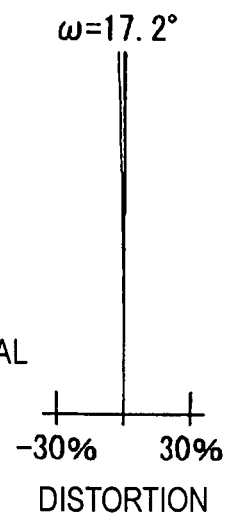
FIG. 26C shows distortion.

Similarly, the various aberration of the zoom lens according to Example 2 are shown in FIG. 19A to FIG. 19C (the wide angle end) and FIG. 20A to FIG. 20C (the telephoto end). Similarly, the various aberration of the zoom lens according to Example 3 are shown in FIG. 21A to FIG. 21C (the wide angle end) and FIG. 22A to FIG. 22C (the telephoto end). Similarly, various aberration of the zoom lens according to Example 4 are shown in FIG. 23A to FIG. 23C (the wide angle end) and FIG. 24A to FIG. 24C (the telephoto end). Similarly, various aberration of the zoom lens according to Example 5 are shown in FIG. 25A to FIG. 25C (the wide angle end) and FIG. 26A to FIG. 26C (the telephoto end).

As can be appreciated from the respective numerical data and the respective aberration charts shown in the figures, the compact and high variable power zoom lens system whose aberrations, particularly chromatic aberration is corrected satisfactorily from the visible range to the near-infrared range and which is suitable for the compact surveillance dome camera for the purpose of surveillance, for example, could be realized in respective Examples.

It is noted that the invention is not limited to above embodiment and respective Examples. Various modifications may be made. For example, the values of the radius of curvature, the surface separation, the refractive index, and the like of respective lens components are not limited to the values given in respective numerical examples, and other values may be employed.

What is claimed is:

1. A zoom lens comprising:
   a first group having a negative refractive power;
   a diaphragm; and
   a second group having a positive refractive power, wherein:
   the first group, the diaphragm and the second group are arranged in order from an object side,
   upon varying a power from a wide angle end to a telephoto end, power variation is executed by moving the second group toward the object side along an optical axis,
   correction of an image plane associated with the power variation is made by moving the first group along the optical axis,
   the second group comprises:
   a first lens having a positive refractive power,
   a cemented lens formed of a second lens having a positive refractive power and a third lens having a negative refractive power,
   a fourth lens having a negative refractive power, wherein a surface of the fourth lens on the object side has a convex shape and a surface of the fourth lens on an image side has a concave shape, and
   a fifth lens having a positive refractive power, and
   the first lens, the cemented lens, the fourth lens and the fifth lens are arranged in order from the object side, and
   wherein the following conditional expressions are satisfied:

$$20.0 < v_{d2f} < 45.0 \quad (2)$$

where $v_{d2f}$ denotes an Abbe number of a lens, closest to an image side, of the second group with respect to d-line, and $$|R_{25r}| > 3|R_{25f}|$$

where $R_{25r}$ denotes a radius of curvature of the fifth lens on the image side and $R_{25f}$ denotes a radius of curvature of the fifth lens on the object side.

2. The zoom lens according to claim 1, wherein the following conditional expression is satisfied:

$$-1.5 < m < -0.35 \quad (1)$$

where m denotes a lateral magnification of the second group.

3. The zoom lens according to claim 1, wherein a surface of the third lens of the second group on an image side has a convex shape.

4. The zoom lens according to claim 1, wherein the following conditional expressions are satisfied:

$$v_{d22} > 50.0 \quad (3)$$

where $v_{d22}$ denotes an Abbe number of the second lens with respect to d-line.

5. The zoom lens according to claim 1, wherein both surfaces of the first lens of the second group has an aspheric shape.

6. The zoom lens according to claim 1, wherein the first group comprises:
   a first lens having a negative refractive power;
   a second lens having a negative refractive power; and
   a third lens having a positive refractive power.

7. The zoom lens according to claim 6, wherein a surface of the first lens of the first group toward the object side has a convex shape.

8. The zoom lens according to claim 6, wherein the second lens of the first group has a biconcave shape.

9. The zoom lens according to claim 6, wherein a surface of the third lens of the first group toward the object side has a convex shape.

10. A zoom lens comprising:
    a first group having a negative refractive power;
    a diaphragm; and
    a second group having a positive refractive power,
    wherein the first group, the diaphragm and the second group are arranged in order from an object side,
    upon varying a power from a wide angle end to a telephoto end, power variation is executed by moving the second group to the object side along an optical axis,
    the second group consists of
    a first lens having a positive refractive power,
    a cemented lens formed of a second lens having a positive refractive power and third lens having a negative refractive power,
    a fourth lens having a negative refractive power, wherein a surface of the fourth lens on the object side has a convex shape and a surface of the fourth lens on an image side has a concave shape, and
    a fifth lens having a positive refractive power having a refractive index of more than 1.8,
    the first lens, the cemented lens, the fourth lens and the fifth lens are arranged in order from the object side, and
    the following conditional expressions are satisfied:

$$20.0 < v_{d2f} < 45.0 \quad (2)$$

$$|R25f| < |R25r| \quad (4)$$

where $v_{d2f}$ denotes an Abbe number of the lens, closest to the image side, of the second group with respect to d-line,
    $R_{25f}$ denotes a radius of curvature of the fifth lens on the object side, and
    $R_{25r}$ denotes a radius of curvature of the fifth lens on the image side.

* * * * *